(12) United States Patent
Nabeshima (10) Patent No.: US 12,147,629 B2
(45) Date of Patent: Nov. 19, 2024

(54) ELECTRONIC APPARATUS, CONTROL METHOD FOR ELECTRONIC APPARATUS, AND STORAGE MEDIUM

(71) Applicant: CANON KABUSHIKI KAISHA, Tokyo (JP)

(72) Inventor: Rui Nabeshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/732,310

(22) Filed: Apr. 28, 2022

(65) Prior Publication Data

US 2022/0357833 A1 Nov. 10, 2022

(30) Foreign Application Priority Data

May 7, 2021 (JP) .................................. 2021-079110

(51) Int. Cl.
  *G06F 3/041* (2006.01)
  *G06F 3/01* (2006.01)
  *G06F 3/0488* (2022.01)
  *H04N 23/611* (2023.01)
  *H04N 23/62* (2023.01)
  *H04N 23/63* (2023.01)

(52) U.S. Cl.
  CPC .......... *G06F 3/04186* (2019.05); *G06F 3/013* (2013.01); *G06F 3/0488* (2013.01); *H04N 23/611* (2023.01); *H04N 23/62* (2023.01); *H04N 23/631* (2023.01)

(58) Field of Classification Search
  CPC .... G06F 3/04186; G06F 3/013; G06F 3/0488; H04N 23/611; H04N 23/62; H04N 23/631
  See application file for complete search history.

(56) References Cited

U.S. PATENT DOCUMENTS

| | | | | |
|---|---|---|---|---|
| 9,560,261 | B2* | 1/2017 | Ishihara | H04N 23/632 |
| 10,313,586 | B2* | 6/2019 | Hoshina | H04N 23/65 |
| 10,764,502 | B2* | 9/2020 | Yoshida | H04N 23/51 |
| 10,904,428 | B2* | 1/2021 | Kamiya | H04N 23/617 |
| 10,924,678 | B2* | 2/2021 | Ueno | H04N 23/633 |
| 10,969,866 | B1* | 4/2021 | Ely | G04G 21/08 |
| 10,999,496 | B2* | 5/2021 | Yoshida | H04N 23/667 |
| 11,134,187 | B2* | 9/2021 | Izuoka | G06F 1/169 |
| 2007/0165115 | A1* | 7/2007 | Sugimoto | H04N 23/634 |
| | | | | 348/E5.042 |
| 2010/0134676 | A1* | 6/2010 | Miyanishi | H04N 23/62 |
| | | | | 348/E5.022 |

(Continued)

FOREIGN PATENT DOCUMENTS

JP 2012203143 A 10/2012

*Primary Examiner* — Ibrahim A Khan
(74) *Attorney, Agent, or Firm* — Canon U.S.A., Inc. IP Division (57) ABSTRACT

A digital camera includes a system control unit. The system control unit detects a touch operation on a touch panel, does not perform processing corresponding to the touch operation performed on the touch panel within a predetermined time period from a shift of a user's eye with respect to a finder from an eye-separation state to an eye-proximity state, and performs the processing corresponding to the touch operation performed after the predetermined time period has elapsed from the shift of the user's eye with respect to the finder from the eye-separation state to the eve-proximity state.

9 Claims, 5 Drawing Sheets

(56) References Cited

U.S. PATENT DOCUMENTS

| | | | | |
|---|---|---|---|---|
| 2010/0134677 | A1* | 6/2010 | Yamamoto | H04N 23/63 |
| | | | | 348/333.01 |
| 2011/0249165 | A1* | 10/2011 | Churei | G03B 13/02 |
| | | | | 348/333.02 |
| 2012/0262407 | A1* | 10/2012 | Hinckley | G06F 3/04883 |
| | | | | 345/173 |
| 2013/0083228 | A1* | 4/2013 | Iwatani | H04N 23/631 |
| | | | | 348/333.01 |
| 2014/0101575 | A1* | 4/2014 | Kwak | G06F 3/0486 |
| | | | | 715/761 |
| 2016/0216796 | A1* | 7/2016 | Johansson | G06F 3/0412 |
| 2016/0224179 | A1* | 8/2016 | Ichihara | H04N 23/62 |
| 2017/0104922 | A1* | 4/2017 | Matsushima | H04N 23/62 |
| 2017/0155826 | A1* | 6/2017 | Nakagawa | H04N 23/634 |
| 2017/0180634 | A1* | 6/2017 | Nakamura | G06F 1/1694 |
| 2017/0195553 | A1* | 7/2017 | Shiozaki | G06F 3/0488 |
| 2018/0041712 | A1* | 2/2018 | Nakagawara | H04N 23/63 |
| 2018/0129262 | A1* | 5/2018 | Veiga | G06F 3/0488 |
| 2018/0324351 | A1* | 11/2018 | Yoshimoto | G06F 3/041 |
| 2019/0007612 | A1* | 1/2019 | Hoshina | G09G 3/20 |
| 2019/0007622 | A1* | 1/2019 | Fujihashi | G06F 3/0416 |
| 2022/0103759 | A1* | 3/2022 | Osuka | H04N 23/61 |

\* cited by examiner

ELECTRONIC APPARATUS, CONTROL METHOD FOR ELECTRONIC APPARATUS, AND STORAGE MEDIUM

BACKGROUND

Field of the Disclosure

The present disclosure relates to an electronic apparatus capable of performing processing corresponding to a touch operation, a control method for the electronic apparatus, and a storage medium.

Description of the Related Art

In these days, a user sometimes changes a selected position or makes a setting by an operation on a touch panel, serving as an operation input device, together with an operation of an operation unit, such as a button, a four-way operational key, and a dial.

Japanese Patent Application Laid-open No. 2012-203143 discusses a method of specifying an auto-focus (AF) position by a user operating a touch panel provided on the back side of an imaging apparatus while looking into a display unit in a finder.

However, in a case where the user performs a touch operation while looking into the finder, an unintended operation may sometimes be made because a part of the user's face, such as a nose, touches the touch panel. There is known a method of preventing an erroneous detection of a nose by limiting a touch-operation allowable area. However, in this case, the touch-operation allowable area becomes narrow, which is an issue.

There is another method of receiving only a touch operation with a touched point having moved more than a predetermined distance. However, in this case, a touch operation with a small touch movement amount, such as a tap operation, cannot be accepted.

SUMMARY

The present disclosure is directed to an electronic apparatus capable of preventing an execution of unintended processing caused by a part of a user's face touching a touch panel when the user looks into a finder.

According to an aspect of the present disclosure, there is provided an electronic apparatus including a memory and at least one processor which function as a detection unit configured to detect a touch operation performed on a touch panel, and a control unit configured to perform processing corresponding to the touch operation performed on the touch panel after a predetermined time period has elapsed from an occurrence of a specific event, and not to perform the processing corresponding to the touch operation performed on the touch panel within the predetermined time period from the occurrence of the specific event.

Further features of the present disclosure will become apparent from the following description of exemplary embodiments with reference to the attached drawings.

DESCRIPTION OF THE EMBODIMENTS

Hereinbelow, exemplary embodiments of the present disclosure will be described with reference to the accompanying drawings.

Figure 1A:
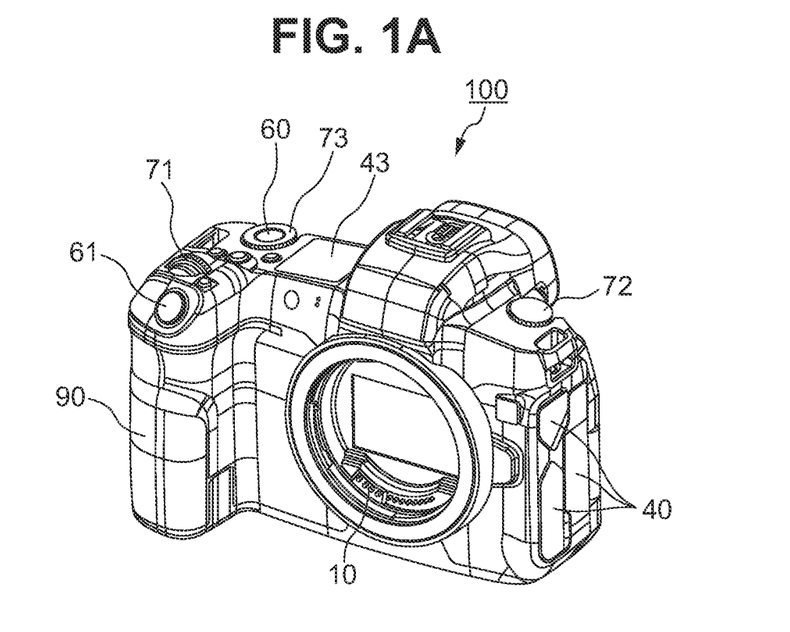
FIGS. 1A and 1B are diagrams each illustrating an appearance of a digital camera.
Figure 1B:
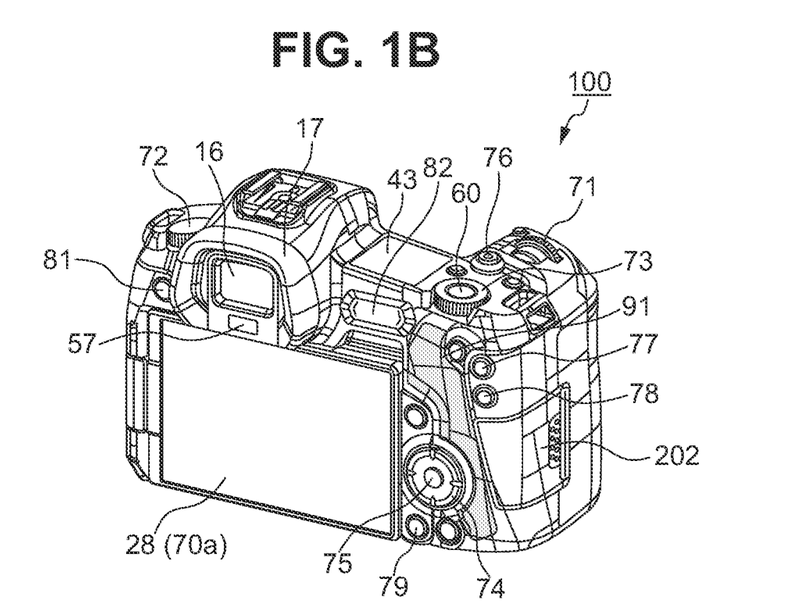

FIGS. 1A and 1B are diagrams each illustrating an appearance of a digital camera 100 (imaging apparatus), as an example of an apparatus to which the present disclosure is applicable. FIG. 1A is a perspective view of the digital camera 100 seen from a front side of the digital camera 100, and FIG. 1B is a perspective view of the digital camera 100 seen from a back side of the digital camera 100.

A display unit 28 is a display unit provided on the back side of the digital camera 100 to display an image and/or various types of information. A touch panel 70a can detect a touch operation on a display surface (touch operation surface) of the display unit 28. A direction of displaying an image on the display unit 28 can be adjusted to the same direction as on an electronic viewfinder (EVF) 29.

An out-of-finder display unit 43 is a display unit provided on a top surface of the digital camera 100 to display various setting values for the digital camera 100, such as a shutter speed and an aperture value. A shutter button 61 is an operation member for issuing an image capturing instruction. A mode change switch 60 is an operation member for switching between various modes. A terminal cover 40 is a cover for protecting a connector (not illustrated) for a connection cable used for connecting the digital camera 100 to an external apparatus.

A main electronic dial 71 is a rotational operation member, and can change setting values, such as a shutter speed and an aperture value, by rotating the main electronic dial 71. A power switch 72 is an operation member for switching power of the digital camera 100 between on and off. A sub electronic dial 73 is a rotational operation member for moving a selection frame (cursor) and advancing images, by rotating the sub electronic dial 73. A four-way operational key 74 is configured in such a manner that upper, lower, left, and right portions thereof can be pressed, and processing corresponding to the pressed portion of the four-way operational key 74 can be performed. A set button 75 is a press button mainly used for determining a selected item.

A movie button 76 is used for issuing an instruction to start or stop capturing (recording) a moving image. An automatic exposure (AE) lock button 77 is a press button that can fix an exposure state by pressing the AE lock button 77 in an image capturing standby state. An enlargement button 78 is an operation button for switching an enlargement mode between on and off in a live view (LV) display mode in the imaging modes. By operating the main electronic dial 71 after switching the enlargement mode to on, the LV image can be enlarged or reduced. In a reproduction mode, the enlargement button 78 functions as an operation button for enlarging a reproduced image and increasing an enlargement ratio of the reproduced image.

A reproduction button 79 is an operation button for switching between an image capturing mode and the reproduction mode. By pressing the reproduction button 79 in the image capturing mode, the mode is shifted to the reproduction mode, and the latest image recorded in a recording medium 200 (described below) can be displayed on the display unit 28. A menu button 81 is a press button used for performing an instruction operation to display a menu screen, and a menu screen with which various settings can be made is displayed on the display unit 28 when the menu button 81 is pressed. A user can intuitively perform various settings using the menu screen displayed on the display unit 28, the four-way operational key 74, and the set button 75.

A touch bar 82 (multifunction bar) is a touch operation member (line touch sensor) in a line shape capable of receiving a touch operation. The touch bar 82 is arranged at a position at which a touch operation can be performed (touchable) with the thumb of a user's right hand in a state where the user grips a grip portion 90 with the user's right hand (little finger, third finger, and middle finger of the user's right hand) in such a manner that the user can press the shutter button 61 with the index finger of the user's right hand. In other words, the touch bar 82 is arranged at a position at which a user can operate the touch bar 82 in a state where the user looks into an eyepiece finder 17 with the user's eye close to an eyepiece portion 16 and ready for pressing the shutter button 61 at any time (image capturing posture).

The touch bar 82 is a reception unit that can receive a tap operation (operation of removing a user's finger from the touch bar 82 without moving a touched point for a predetermined time period after touching the touch bar), and a right-and-left slide operation (operation of moving a touched point in a state of touching the touch bar after touching the touch bar), performed on the touch bar 82. The touch bar 82 is an operation member different from the touch panel 70a, and does not include a display function.

A communication terminal 10 is used for the digital camera 100 to communicate with a lens unit 150 (interchangeable lens unit) to be described below. The eyepiece portion 16 is an eyepiece portion for the eyepiece finder 17 (look-in type finder), and a user can visually recognize an image displayed on the internal EVF 29 through the eyepiece portion 16. An eye-proximity detection unit 57 is an eye-proximity sensor for detecting whether a user's (photographer's) eye is close to (or contacts) the eyepiece portion 16 (i.e., eye-proximity state).

A cover 202 is a cover for a slot in which the recording medium 200 (described below) is housed. The grip portion 90 is a holding portion with a shape easy to be gripped in the user's right hand when the user holds the digital camera 100 in a posture for capturing an image.

The shutter button 61 and the main electronic dial 71 are arranged each at a position operable with the index finger of the user's right hand, in a state where the user is holding the grip portion 90 to support the digital camera 100 with the little finger, the third finger, and the middle finger of the user's right hand. The sub electronic dial 73 and the touch bar 82 are arranged each at a position operable with the thumb of the user's right hand in the same holding state. A thumb rest portion 91 (thumb standby position) is a grip member provided at a position on the back side of the digital camera 100 at which a user can easily place the thumb of the user's right hand gripping the grip portion 90 in a state where the user is not operating any operation member. The thumb rest portion 91 includes a rubber member or the like to increase a holding force (grip feeling).

Figure 2:
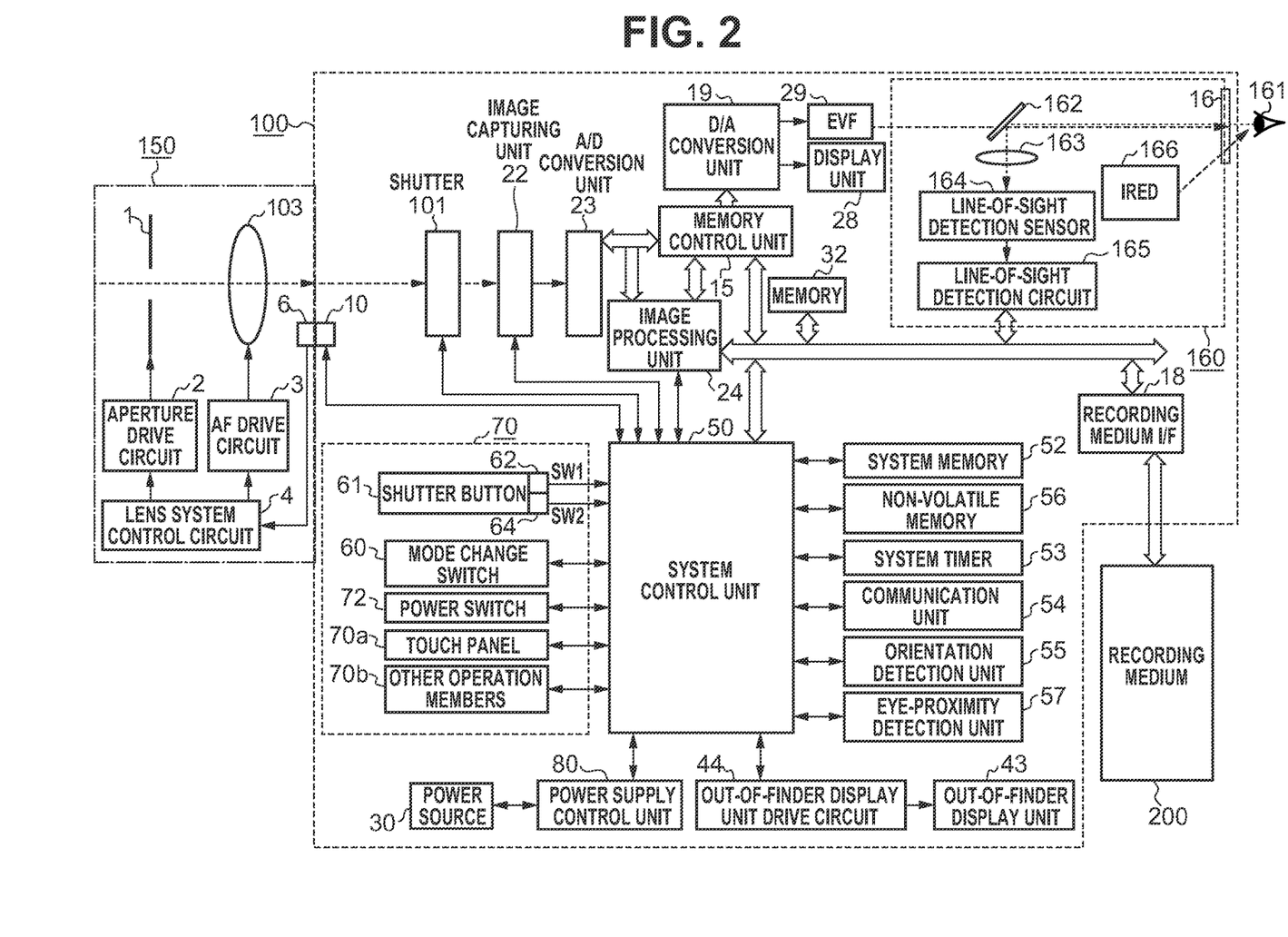
FIG. 2 is a block diagram of the digital camera.

FIG. 2 is a block diagram illustrating a configuration example of the digital camera 100 and the lens unit 150. The lens unit 150 is an interchangeable lens unit including an imaging lens 103. While the imaging lens 103 normally includes a plurality of lenses, the imaging lens 103 is illustrated as one lens in FIG. 2 for simplification. A communication terminal 6 is used for the lens unit 150 to communicate with the digital camera 100, and the communication terminal 10 is used for the digital camera 100 to communicate with the lens unit 150. The lens unit 150 communicates with a system control unit 50 via the communication terminals 6 and 10. The lens unit 150 controls an aperture 1 by a lens system control circuit 4 in the lens unit 150 via an aperture drive circuit 2. The lens unit 150 can perform focusing by the lens system control circuit 4 moving a position of the imaging lens 103 via an auto-focus (AF) drive circuit 3.

A shutter 101 is a focal plane shutter that can freely control an exposure time for an image capturing unit 22 under control of the system control unit 50.

The image capturing unit 22 is an image capturing device (image sensor), such as a charge-coupled device (CCD) sensor and a complementary metal-oxide semiconductor (CMOS) sensor, that converts an optical image into an electrical signal. The image capturing unit 22 may include an imaging plane phase-difference sensor that outputs defocus amount information to the system control unit 50. An analog to digital (A/D) conversion unit 23 converts an analog signal output from the image capturing unit 22 into a digital signal.

An image processing unit 24 performs predetermined processing (e.g., resize processing, such as pixel interpolation and size reduction, and color conversion processing) on data output from the A/D conversion unit 23 or data output from a memory control unit 15. The image processing unit 24 performs predetermined calculation processing using the captured image data, and the system control unit 50 performs exposure control and range-finding control based on the calculation result obtained from the image processing unit 24. In this way, through-the-lens (TTL) AF processing, AE processing, electronic flash preliminary emission (EF) processing, and other processing are performed. The image processing unit 24 further performs predetermined calculation processing using the captured image data, and the system control unit 50 performs TTL automatic white balance (AWB) processing based on a calculation result obtained from the image processing unit 24.

The data output from the A/D conversion unit 23 is written into a memory 32 via the image processing unit 24 and the memory control unit 15. Alternatively, the data output from the A/D conversion unit 23 is written into the memory 32 via the memory control unit 15 without going through the image processing unit 24. The memory 32 stores the image data obtained by the image capturing unit 22 and converted into the digital data by the A/D conversion unit 23, and the image data to be used for display on the display unit 28 and/or the EVF 29. The memory 32 has enough capacity for storing a predetermined number of still images and a predetermined time period of moving image and sound.

The memory 32 also functions as a memory for image display (video memory). A digital to analog (D/A) conversion unit 19 converts the data for image display stored in the memory 32 into an analog signal, and supplies the analog signal to the display unit 28 or the EVF 29. In this way, the image data for display written in the memory 32 is displayed on the display unit 28 and/or the EVF 29 via the D/A conversion unit 19. Each of the display unit 28 and the EVF 29 is a liquid crystal display or an organic electroluminescence display to perform display based on the analog signal output from the D/A conversion unit 19, LV display can be performed by the D/A conversion unit 19 converting the digital signal, which has been converted by the A/D conversion unit 23 and stored in the memory 32, into an analog signal, and successively transferring the converted analog signal to the display unit 28 or the EVF 29. Hereinbelow, the image displayed by the LV display is referred to as an LV image.

The system control unit 50 is a control unit including at least one processor and/or at least one circuit, and controls the whole digital camera 100. The system control unit 50 can be a processor and a circuit. The system control unit 50 implements processing according to the present exemplary embodiment described below by executing a program stored in a non-volatile memory 56. The system control unit 50 also performs display control by controlling the memory 32, the D/A conversion unit 19, the display unit 28, the EVF 29, and the like.

A system memory 52 is, for example, a random access memory (RAM), and the system control unit 50 loads, in the system memory 52, constants and variables for the operation of the system control unit 50, the program read from the non-volatile memory 56, and the like.

The non-volatile memory 56 is an electrically erasable and recordable memory, for example, an electrically erasable programmable read-only memory (EEPROM). In the non-volatile memory 56, the constants, the program for the operation of the system control unit 50, and the like are stored. The program here refers to a program for executing various processes in flowcharts according to the present exemplary embodiment described below.

A system timer 53 is a timer unit for counting time used for various controls and time for a built-in clock.

A communication unit 54 transmits and receives an image signal and an audio signal to and from an external apparatus connected to the communication unit 54 wirelessly or with a wired cable. The communication unit 54 can also connect to a wireless local area network (LAN) and the Internet. The communication unit 54 can also communicate with an external apparatus using Bluetooth® or Bluetooth® Low Energy. The communication unit 54 can transmit an image (including an LV image) captured by the image capturing unit 22, and an image recorded in the recording medium 200, and can receive image data and various types of information from an external apparatus.

An orientation detection unit 55 detects an orientation of the digital camera 100 with respect to the gravity direction. Based on the orientation detected by the orientation detection unit 55, it is possible to determine whether an image captured by the image capturing unit 22 is captured with the digital camera 100 in a horizontal (landscape) orientation or a vertical (portrait) orientation. The system control unit 50 can add orientation information corresponding to the orientation detected by the orientation detection unit 55 to an image file of the image captured by the image capturing unit 22, and rotate and record the image. As the orientation detection unit 55, an acceleration sensor or a gyroscope sensor can be used. Using the acceleration sensor or the gyroscope sensor serving as the orientation detection unit 55, it is also possible to detect the movement of the digital camera 100 (panned, tilted, lifted, or not moved).

The eye-proximity detection unit 57 is an eye-proximity sensor for detecting the proximity (eye-proximity) and separation (eye-separation) of an eye (object) with respect to the eyepiece portion 16 of the eyepiece finder (hereinbelow, simply referred to as a finder) 17 (i.e., proximity detection).

The system control unit 50 switches between a display state and a non-display state of the display unit 28 and the EVF 29, based on the state detected by the eye-proximity detection unit 57. More specifically, in a state where at least the digital camera 100 is in a standby state and the switching setting of the display destination is set to an automatic switching, the display destination is set to the display unit 28 with the display state turned on, and the EVF 29 is set to a non-display state while the user's eye is not close to the eyepiece portion 16 (eye-separation state). While the user's eye is close to the eyepiece portion 16 (eye-proximity state), the display destination is set to the EVF 29 with the display state turned on, and the display unit 28 is set to a non-display state.

For the eye-proximity detection unit 57, for example, an infrared light proximity sensor can be used for detecting proximity of any objects to the eyepiece portion 16 of the finder 17 with the EVF 29 built therein. When an object is in proximity to the eyepiece portion 16, infrared light emitted from a light emission unit (not illustrated) of the eye-proximity detection unit 57 and reflected by the object is received by a light-reception unit (not illustrated) of the infrared light proximity sensor. Based on an amount of the received infrared light, it is also possible to determine how close the object has approached the eyepiece portion 16 (proximity distance).

In this way, the eye-proximity detection unit 57 performs the eye-proximity detection for detecting the proximity distance of the object to the eyepiece portion 16. The eye-proximity detection unit 57 detects that the user's eye is in proximity to the eyepiece portion 16 in a case where an object that has approached the eyepiece portion 16 within a predetermined distance (threshold) from an eye-separation state (non-proximity state) is detected. The eye-proximity detection unit 57 detects that the user's eye is separated from the eyepiece portion 16 in a case where the object for which the proximity to the eyepiece portion 16 has been detected is moved apart from the eyepiece portion 16 more than the predetermined distance (threshold), from the eye-proximity state. The threshold for detecting the eye-proximity state and the threshold for detecting the eye-separation state may be different, for example, by providing hysteresis. After detecting the eye-proximity state, the eye-proximity detection unit 57 determines that the user's eye is in an eye-proximity state until detecting the eye-separation state. After detecting the eye-separation state, the eye-proximity detection unit 57 determines that the user's eye is in the eye-separation state until detecting the eye-proximity state. The infrared light proximity sensor is merely an example, and any other sensors may be employed as long as the sensors can detect the state that can be regarded as the eye-proximity state.

On the out-of-finder display unit 43, various setting values, such as a shutter speed and an aperture value, are displayed via an out-of-finder display unit drive circuit 44.

A power supply control unit 80 includes a battery detection circuit, a direct-current to direct-current (DC/DC) converter, and a switching circuit for switching between blocks to supply power, and detects mounting of a battery, a type of a battery, and a remaining battery capacity. The power supply control unit 80 controls the DC/DC converter based on a detection result and an instruction from the system control unit 50 to supply a required voltage for a required time period to each of units including the recording medium 200. A power source 30 includes a primary battery such as an alkali battery and a lithium battery, a secondary battery such as a nickel-cadmium (NiCd) battery, a nickel-metal hydride (NiMH) battery, and a lithium (Li) battery, and an alternate current (AC) adopter.

A recording medium interface (I/F) 18 is an interface with the recording medium 200, such as a memory card and a hard disk. The recording medium 200 is a recording medium such as a memory card for recording captured images, and includes a semiconductor memory and/or a magnetic disk.

An operation unit 70 is an input unit for receiving an operation from a user (user operation), and is used for inputting various operation instructions to the system control unit 50. As illustrated in FIG. 2, the operation unit 70 includes the shutter button 61, the mode change switch 60, the power switch 72, the touch panel 70*a*, and the other operation members 70*b*. The other operation members 70*b* include the main electronic dial 71, the sub electronic dial 73, the four-way operational key 74, the set button 75, the movie button 76, the AE lock button 77, the enlargement button 78, the reproduction button 79, the menu button 81, and the touch bar 82.

The shutter button 61 includes a first shutter switch 62 and a second shutter switch 64. The first shutter switch 62 turns on in partway of the operation of the shutter button 61, so-called a half press state (i.e., imaging preparation instruction), and generates a first shutter switch signal SW1. The system control unit 50 starts an imaging preparation operation such as the AF processing, the AE processing, the AWB processing, and the EF processing, in response to the first shutter switch signal SW1.

The second shutter switch 64 turns on in completion of the operation of the shutter button 61, so-called a full press state (i.e., imaging instruction), and generates a second shutter switch signal SW2. In response to the second shutter switch signal SW2, the system control unit 50 starts a series of imaging processing operations, starting from an operation of reading out signals from the image capturing unit 22 to an operation of writing the captured image in the recording medium 200 as an image file.

The mode change switch 60 switches the operation mode of the system control unit 50 to any one of a still image capturing mode, a moving image capturing mode, and a reproduction mode. Examples of modes included in the still image capturing mode include an automatic image capturing mode, an automatic scene determination mode, a manual mode, an aperture priority mode (Av mode), a shutter speed priority mode (Tv mode), and a program AE mode (P mode). Examples of modes included in the still image capturing mode further include various scene modes corresponding to various imaging scenes as an imaging setting and a custom mode. A user can switch the mode to any one of the modes directly by the mode change switch 60. Alternatively, a user may switch the screen to a list screen of the imaging modes once using the mode change switch 60, and then selectively switch the mode to any one of a plurality of displayed modes using any of the other operation members 70*b*. Similarly, the moving image capturing mode may include a plurality of modes.

The touch panel 70*a* is a touch sensor for detecting various touch operations on a display surface of the display unit 28 (operation surface of the touch panel 70*a*). The touch panel 70*a* and the display unit 28 can be integrally formed. For example, the touch panel 70*a* is formed to have enough transmission ratio so as not to hinder the display of the display unit 28, and attached on an upper layer of the display surface of the display unit 28. Input coordinates on the touch panel 70*a* and display coordinates on the display surface of the display unit 28 are associated. In this way, a graphical user interface (GUI) with which a user can experience as if to directly operate the screen displayed on the display unit 28, can be provided.

The system control unit 50 can detect the following operations performed on the touch panel 70*a* or the states of the touch panel 70*a*:

an operation of newly touching the touch panel 70*a* with a finger or a pen that has not touched the touch panel 70*a*, i.e., start of touch (hereinbelow, referred to as a "touch-down");

a state of touching the touch panel 70*a* with a finger or a pen (hereinbelow, referred to as a "touch-on");

an operation of moving a finger or a pen on the touch panel 70*a* in a state of touching the touch panel 70*a* (hereinbelow, referred to as a "touch-move");

an operation of removing a finger or a pen that has touched the touch panel 70*a* from the touch panel 70*a*, i.e., end of touch (hereinbelow, referred to as a "touch-up"); and a state of not touching the touch panel 70*a* with a finger or a pen (hereinbelow, referred to as a "touch-off").

When a touch-down is detected, a touch-on is also detected. Normally, the touch-on is continuously detected unless a touch-up is not detected after the touch-down. Similarly, when a touch-move is detected, a touch-on is also detected. A touch-move is not detected if a touch-on is detected but the touched point does not move. A touch-off is detected after an operation of touch-ups by all the fingers or pens is detected.

These operations or states and the positional coordinates on the touch panel 70*a* touched by a finger or a pen are notified to the system control unit 50 via an internal bus. The system control unit 50 determines, based on the notified information, what type of operation (touch operation) has been performed on the touch panel 70*a*. As for the touch-move, the system control unit 50 can determine, based on the change in the positional coordinates, the moving direction of the finger or the pen moving on the touch panel 70*a* for each of the vertical component and the horizontal component on the touch panel 70*a*. In a case where the touch-move more than a predetermined distance is detected, the system control unit 50 determines that a slide operation has been performed.

An operation of quickly moving a finger by a certain distance in a state of touching the touch panel 70*a* with the finger and then removing the finger from the touch panel 70*a* is called a "flick". In other words, the flick is an operation of quickly sliding a finger on the touch panel 70*a*, in other words, as if flipping the touch panel 70*a* with the finger. In a case where a touch-move by a distance more than a predetermined distance and at a speed faster than a predetermined speed is detected and then a touch-up is detected, the system control unit 50 can determine that a flick has been performed. In other words, the system control unit 50 determines that a flick has been performed after a slide operation.

Further, a touch operation of touching a plurality of positions (e.g., two positions) together on the touch panel 70*a* (multi-touch) and then moving the touched positions closer to each other is called a "pinch-in", and moving the touch positions away from each other is called a "pinch-out". The pinch-in and the pinch-out are collectively called a pinch operation or simply a pinch.

The touch panel 70*a* may be a touch panel of any one of various types, such as a resistance film type, an electrostatic capacitance type, a surface acoustic wave type, and an infrared light type, an electromagnetic induction type, an image recognition type, and an optical sensor type. There are types of a touch panel that detects a touch operation when a contact is made on the touch panel, and a touch panel that detects a touch operation when a finger or a pen is placed close to the touch panel, and any type may be employed.

The notification of the detection of the touch operation from the touch panel 70a to the system control unit 50 is performed in the following manner:

active (touch-down or touch-move)+touch identification (ID)+touch coordinates; and inactive (touch-up)+touch ID.

The touch ID is used for distinguishing fingers or pens touching a plurality of positions. Active is notified when a touch-down or a touch-move is performed. Inactive is notified when a touch-up is performed. Based on the above-described information, touch-down, touch-move, touch-up, flick, and pinch operations are distinguished.

A line-of-sight detection block 160 is a block for detecting a line-of-sight to determine whether a user with their eye in proximity to the eyepiece portion 16 looks at the EVF 29, and further which position on the EVF 29 the user is looking at if the user looks at the EVF 29. The line-of-sight detection block 160 includes a dichroic mirror 162, an imaging lens 163, a line-of-sight detection sensor 164, an infrared light-emitting diode (IRED) 166, and a line-of-sight detection circuit 165.

The IRED 166 is a light emitting device to irradiate a user's eyeball (eye) 161 in proximity to the eyepiece portion 16 with the infrared light. The infrared light emitted from the IRED 166 is reflected at the user's eyeball 161 and the reflected infrared light reaches the dichroic mirror 162. The dichroic mirror 162 only reflects the infrared light and transmits visible light. The reflected infrared light with its light path changed forms an image on an imaging plane of the line-of-sight detection sensor 164 through the imaging lens 163.

The imaging lens 163 is an optical member included in a line-of-sight detection optical system. The line-of-sight detection sensor 164 includes an imaging device such as a CCD image sensor. The line-of-sight detection sensor 164 photoelectrically converts the reflected infrared light incident thereon into an electric signal, and outputs the electric signal to the line-of-sight detection circuit 165. The line-of-sight detection circuit 165 includes at least one processor, detects the user's line-of-sight position from an image or a movement of the user's eyeball 161 based on the output signal from the line-of-sight detection sensor 164, and outputs the detected information to the system control unit 50.

In the present exemplary embodiment, the line-of-sight is detected based on a method called a corneal reflection method using the line-of-sight detection block 160. The corneal reflection method is a method of detecting a direction and a position of a line-of-sight from a positional relationship between a pupil of the eyeball 161 and the infrared light that has been emitted from the IRED 166 and reflected on the eyeball 161, particularly on the cornea. Other than this method, there are many methods for detecting a direction and a position of the line-of-sight, such as a method called a sclera reflection method that uses a difference between a reflection ratio of a black part and a reflection ratio of a white part of the eye. Any line-of-sight detection method other than the above-described methods may be used as long as a direction and a position of the line-of-sight can be detected. In the present exemplary embodiment, the light emitting unit and the light reception unit of the eye-proximity detection unit 57 are described to be different devices respectively from the IRED 166 and the line-of-sight detection sensor 164 described above. However, it is not limited thereto, and the IRED 166 may also be used as the light emitting unit of the eye-proximity detection unit 57, and the line-of-sight detection sensor 164 may also be used as the light reception unit.

The system control unit 50 can detect the following operations and states based on the output from the line-of-sight detection block 160:

a state where a line-of-sight of a user with the user's eye close to the eyepiece portion 16 is newly input (detected), i.e., start of the line-of-sight input;

a state where a line-of-sight of a user with the user's eye close to the eyepiece portion 16 is in a certain state;

a state where a user with the user's eye close to the eyepiece portion 16 is in a state of gazing at a position;

an operation that a user with the user's eye close to the eyepiece portion 16 moves away the line-of-sight that has been input, i.e., end of the line-of-sight input; and a state where a user with the user's eye close to the eyepiece portion 16 inputs no line-of-sight.

The "gazing at" used herein means a state where a user is looking at substantially a same position for a certain time period. It is determined that a user is gazing at a position in a case where, for example, a movement amount of a user's line-of-sight position does not exceed a predetermined movement amount for a predetermined time period (e.g., 0.5 seconds). The predetermined time period may be set by a user, may be fixedly determined in advance, or may be changeable depending on a distance relationship between a current line-of-sight position and a line-of-sight position immediately before the current line-of-sight position. For example, the system control unit 50 determines that a user is gazing at a position, in a case where a period of duration of a state in which the user's line-of-sight is detected at substantially a same position (no line-of-sight movement state) has exceeded the predetermined time period (threshold time period), based on the detected information received from the line-of-sight detection circuit 165. The system control unit 50 determines the current state to be the state of no line-of-sight movement state, for example, in a case where an average position of the line-of-sight detected positions in a short time period (≤threshold time period described above) including the latest detection timing is within a predetermined range, and a variation (dispersion) of the line-of-sight detected positions is smaller than a predetermined value.

The system control unit 50 of the digital camera 100 detects a touch operation on the operation surface of the touch panel 70a and performs a function corresponding to the touch operation. The system control unit 50 of the digital camera 100 according to the present exemplary embodiment invalidates a control based on a touch operation performed within a predetermined time period after shift from an eye-separation state to an eye-proximity state while the touch operation is continued. The system control unit 50 of the digital camera 100 according to the present exemplary embodiment invalidates a control based on a touch operation performed within a predetermined time period after the orientation of the digital camera 100 is changed while the touch operation is continued. The user's facial region (e.g., nose) may sometimes have touched the touch panel 70a, immediate after the shift from an eye-separation state to an eye-proximity state, or immediate after the change in the orientation of the digital camera 100. In this case, if a function is performed in response to the touch by the facial region, there may be a fear that a control not intended by the user is performed, which hinders the user's imaging action.

The system control unit 50 of the digital camera 100 according to the present exemplary embodiment prevents the execution of the unintended control by disabling the touch operation performed immediately after the change in the eye-proximity state with respect to the digital camera 100 or the change of the orientation of the digital camera 100.

Hereinbelow, the control performed by the system control unit 50 of the digital camera 100 will be described with reference to FIGS. 3A to 5.

FIGS. 3A, 3B, 3C, 3D, and 3E are schematic diagrams each illustrating a relationship between a user and the digital camera 100, in particular, a display unit (touch panel 70a) of the digital camera 100, in shifting from the eye-separation state to the eye-proximity state.

Figure 3A:
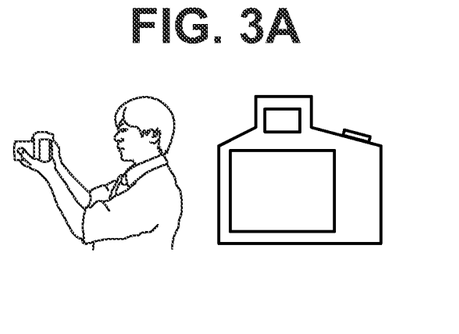
FIGS. 3A, 3B, 3C, 3D, and 3E are schematic diagrams each illustrating a relationship between a user and the digital camera in a case where a state of a user's eye shifts from an eye-separation state (i.e., a user's eye is not close to an eyepiece portion) to an eye-proximity state (i.e., the user's eye is close to the eyepiece portion).

FIG. 3A illustrates a state where the user does not look into the finder 17 (eye-separation state). For example, at this time, the user looks at an LV display on the display surface of the display unit 28. Alternatively, the user looks into the finder 17 to prepare for an image capturing, in a case where the switching setting of the display destination is not automatic and fixed to the EVF 29, or the digital camera 100 is in a power-saving state and the LV display is not performed.

Figure 3B:
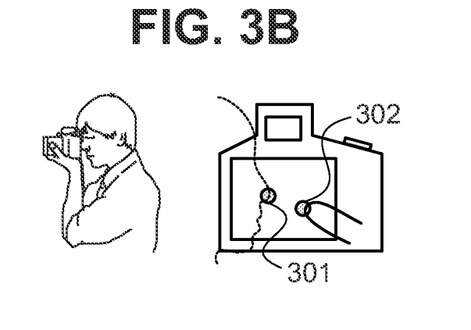

FIG. 3B is a diagram schematically illustrating a state where the state in FIG. 3A changes to a state where the user is looking into the finder 17. At this time, the user's facial region (nose) makes a touch-down on a position 301. On the other hand, the user performs a touch-down with the user's finger on a position 302. The user intentionally performs the touch-down, but the nose unintentionally makes the touch-down. In other words, the touch-down performed on the position 301 is intended by the user.

The system control unit 50 determines that the detected touch-down is highly possible to have been unintentionally made by the nose and the like, in a case where a time difference between a timing of a shift from the eye-separation state to the eye-proximity state and a timing of a detection of the touch-down falls within a predetermined time period. The system control unit 50 determines that the detected touch-down is an invalid touch-down, and dose not perform the function corresponding to the touch-down performed on either the position 301 or the position 302 (invalidates). FIG. 3B illustrates a state within the predetermined time period from the timing of the shift from the eye-separation state to the eye-proximity state. In this case, the system control unit 50 determines that the detected touch-down is an invalid touch-down, and dose not perform the function corresponding to the touch-down performed on either the position 301 or the position 302.

The system control unit 50 may make a determination using, as a reference, a timing at which the line-of-sight detection block 160 detects the line-of-sight, not the timing of the shift from the eye-separation state to the eye-proximity state. The system control unit 50 may perform determination using, as a reference, a timing of starting an image display by the EVF 29.

Figure 3C:
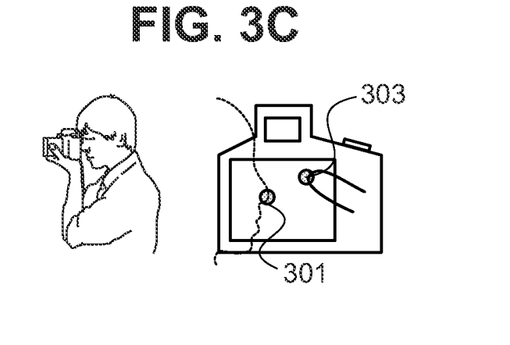

FIG. 3C illustrates a case where the user performs a touch-move from the touched point with the user's finger from the state in FIG. 3B. In this case, the system control unit 50 determines that the touch-move operation from the touch-down at the position 302 to a position 303 is also invalid, because the system control unit 50 has determined that the touch-down with the user's finger at the position 302 is invalid.

However, if two or more points are touched at a timing near the timing of the shift from the eye-separation state to the eye-proximity state, it is highly possible that at least either one of the points is touched by the user's finger. Thus, a touch operation satisfying a predetermined condition is switched to a valid state from an invalid state. For example, the condition is either one of the following cases where:
 (1) a touch-move is performed more than a predetermined movement distance continuously from the touch-down determined to be invalid; and
 (2) a tap operation is performed continuously (double tap operation) from the touch-down determined to be invalid. In addition, the condition may be a case where
 (3) both of two touched points move apart from each other more than a predetermined distance or move close to each other within a predetermined distance (pinch-in and pinch-out operation). If at least any one of these conditions is satisfied, the system control unit 50 determines that the touch-down is a touch operation intentionally performed by the user's finger, not by the facial region, and performs a control corresponding to the touch-down.

Figure 3D:
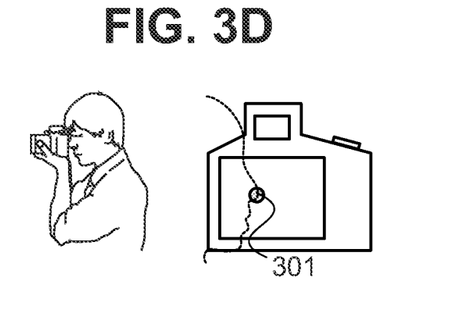

FIG. 3D illustrates a case where a touch-up is performed from the touched point touched only by the user's finger, from the state in FIG. 3C. At this time, in a case where the touch operation by the touch-up is valid, a control corresponding to the touch operation is performed.

Figure 3E:
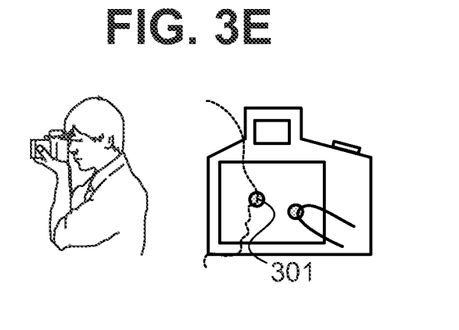

FIG. 3E illustrates a case where the user performs a touch-down again with the user's finger from the state in FIG. 3D. At this time, assume that the predetermined time period has elapsed since the timing of the shift from the eye-separation state to the eye-proximity state. As with the touch-down in FIG. 3B, the system control unit 50 determines whether the touch-down is valid. More specifically, the system control unit 50 determines whether the touch-down is performed within the predetermined time period since the timing of the shift from the eye-separation state to the eye-proximity state. As described above, at this time, the system control unit 50 determines that the touch operation by the touch-down is valid because the predetermined time period has elapsed from the timing of the shift from the eye-separation state to the eye-proximity state. The system control unit 50 performs a function corresponding to the touch operation by the touch-down. The touch-down performed at the position 301 is continued from the timing of the shift from the eye-separation state to the eye-proximity state as illustrated in FIG. 3B. In this case, the system control unit 50 determines that the touch-down on the position 301 is invalid, and does not perform a control corresponding to the touch-down.

More specifically, when the eye-separation state has shifted to the eye-proximity state as illustrated in FIGS. 3A to 3E, the system control unit 50 invalidates the touch-down performed within the predetermined time period from the eye-separation state to the eye-proximity state. This makes it possible to prevent an execution of an unintentional control caused by a touch-down on the touch panel 70a unintentionally made when the user brings the user's face close to the eyepiece portion 16 to look at the EVF 29. A touch operation performed after the eye-separation state shifts to the eye-proximity state is determined to be valid, which enables an operation by a touch operation even when the user's facial region is in contact with the touch panel 70a.

FIGS. 4A, 4B, 4C, 4D, and 4E are schematic diagrams each illustrating a relationship between the user and the digital camera 100, specifically a display unit (touch panel 70a) of the digital camera 100, in a case where an orientation (direction) of the digital camera 100 is changed.

Figure 4A:
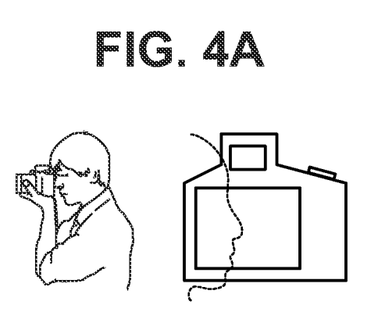
FIGS. 4A, 4B, 4C, 4D, and 4E are schematic diagrams each illustrating a relationship between the user and the digital camera in a case where an orientation (direction) of the digital camera is changed.

FIG. 4A illustrates a state where the user looks into the finder 17 with the digital camera 100 in a landscape orientation. The orientation of the digital camera 100 illustrated in FIG. 4A is defined as a normal orientation (horizontal orientation or landscape orientation).

Figure 4B:
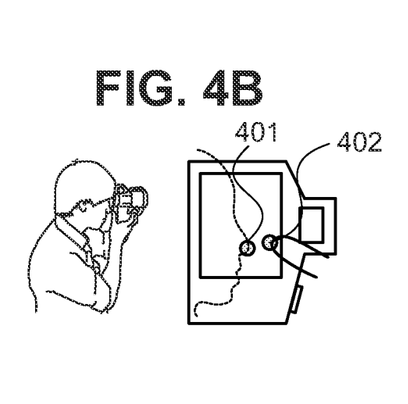

FIG. 4B illustrates a case where the user changes the orientation of the digital camera 100 from the horizontal orientation (landscape orientation), illustrated in FIG. 4A, to the vertical orientation, and a touch-down with the user's finger and a touch-down with the user's nose are detected. The orientation of the digital camera 100 in this case is defined as a portrait orientation. At this time, the user's facial region (nose) performs a touch-down at a position 401, while the user performs a touch-down with a user's finger at a position 402. The user intentionally performs the touch-down, but the nose unintentionally makes another touch-down. In other words, the touch-down performed on the position 401 is not based on the user's intention.

The system control unit 50 determines that it is highly possible that the detected touch-down is unintentionally made, in a case where a time difference between a timing at which the orientation of the digital camera 100 is changed and a timing at which the touch-down is detected is within a predetermined time period. The system control unit 50 determines that the detected touch-down is an invalid touch-down, and dose not perform a function corresponding to the touch-down performed at either the position 401 or the position 402 (invalidates). FIG. 4B illustrates a state within the predetermined time period from the timing at which the orientation of the digital camera 100 is changed. More specifically, the system control unit 50 determines that the detected touch-down is an invalid touch-down, and dose not perform a function corresponding to the touch-down performed at either the position 401 or the position 402. The system control unit 50 may determine whether the orientation of the digital camera 100 is changed based on an image signal not based on the timing at which the orientation of the digital camera 100 is changed.

Figure 4C:
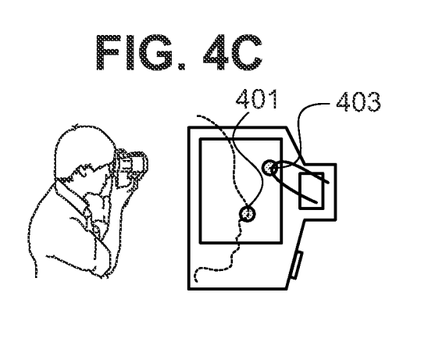

FIG. 4C illustrates a case where the user performs a touch-move from a point touched with the user's finger, from the state in FIG. 4B. In this case, the system control unit 50 determines that the touch-move operation moving to a position 403 from the touch-down on the position 402 is also invalid, because the system control unit 50 has determined that the touch-down with the user's finger on the position 402 is invalid.

However, if two points are touched at a timing near the timing of the shift from the eye-separation state to the eye-proximity state, it is highly possible that at least either one of the points is touched with the user's finger. Accordingly, a touch operation satisfying a predetermined condition is switched to a valid state from an invalid state. For example, the condition is either one of cases where:
 (1) a touch-move is performed by a movement distance more than a threshold continuously from a touch-down determined to be invalid; and
 (2) a tap operation is performed continuously (double tap operation) from the touch-down determined to be invalid. In addition, the condition may be a case where
 (3) both of two touched points move apart from each other more than a predetermined distance or move close to each other within the predetermined distance (so-called pinch-out and pinch-in operation). If at least any one of these conditions is satisfied, the system control unit 50 determines that the touch-down is a touch operation intentionally performed by the user's finger, not by the facial region, and performs a control corresponding to the touch-down.

Figure 4D:
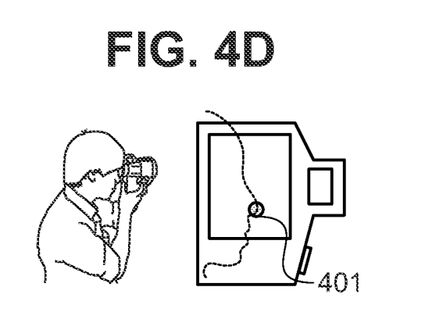

FIG. 4D illustrates a case where a touch-up is performed from the point touched only with the user's finger, from the state in FIG. 4C. In this case, in a case where the touch operation by the touch-up is valid, the system control unit 50 performs a control corresponding to the touch operation.

Figure 4E:
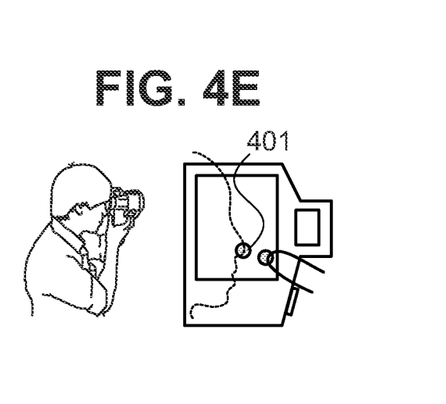

FIG. 4E illustrates a case where the user performs a touch-down again with the user's finger from the state in FIG. 4D. At this time, assume that the predetermined time period has elapsed from the timing at which the orientation of the digital camera 100 is changed. AS with the touch-down in FIG. 4B, the system control unit 50 determines whether the touch-down is valid. More specifically, the system control unit 50 determines whether the touch-down is performed within the predetermined time period from the timing at which the orientation of the digital camera 100 is changed. As described above, in this case, the system control unit 50 determines that the touch operation by the touch-down is valid, because, as described above, the predetermined time period has elapsed from the timing at which the orientation of the digital camera 100 is changed. The system control unit 50 performs a function corresponding to the touch operation by the touch-down. As illustrated in FIG. 4B, the touch-down performed at the position 401 is continued from the timing at which the orientation of the digital camera 100 is changed. In such a case, the system control unit 50 determines that the touch-down on the position 401 is invalid, and does not perform a control corresponding to the touch-down.

More specifically, the system control unit 50 invalidates the touch-down performed within the predetermined time period from the timing at which the orientation of the digital camera 100 is changed in the case where the orientation of the digital camera 100 is changed as illustrated in FIGS. 4A to 4E. This makes it possible to prevent an execution of an unintentional control caused by a touch-down on the touch panel 70a performed unintentionally when an orientation of the digital camera 100 is changed.

Figure 5:
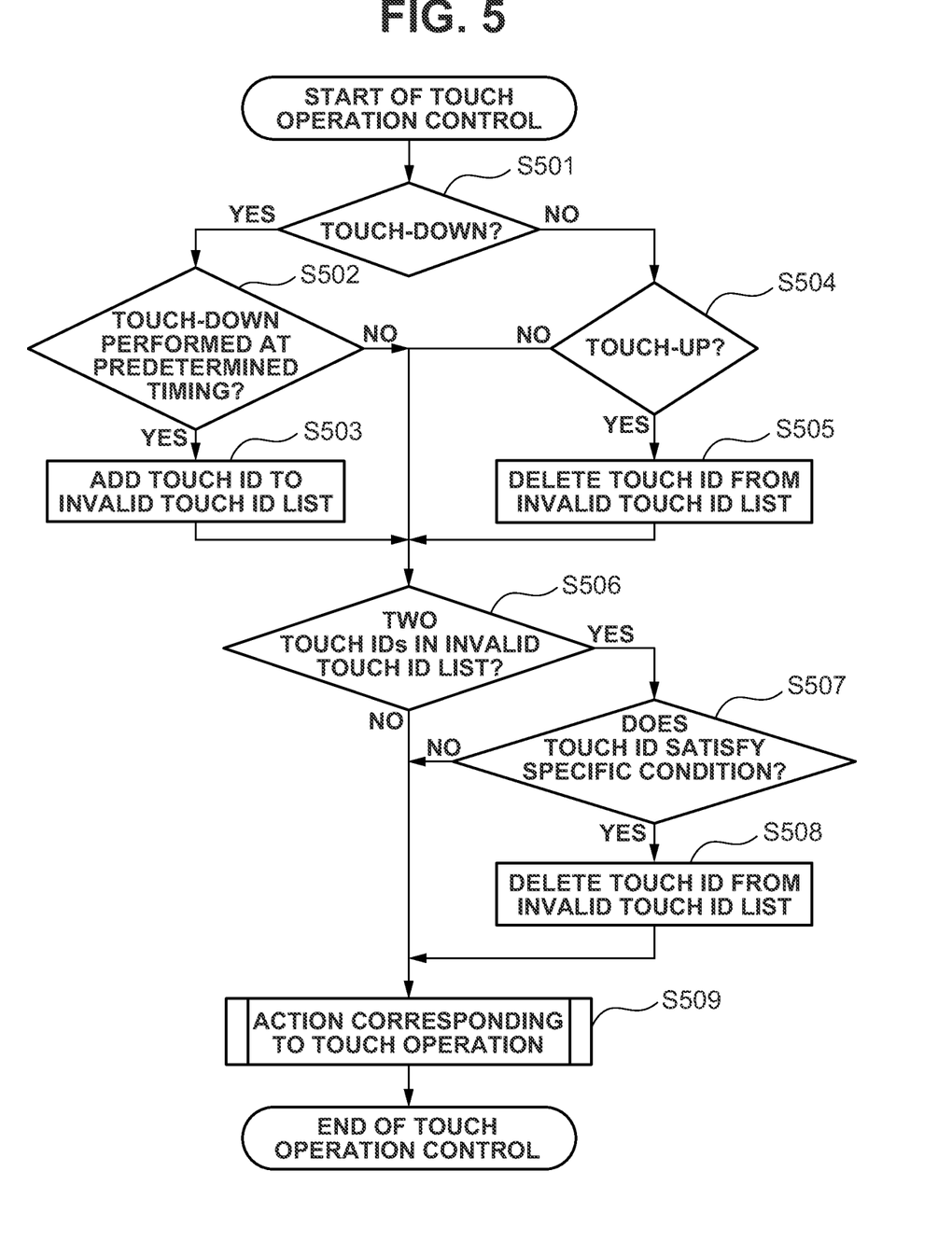
FIG. 5 is a flowchart illustrating a touch operation control.

FIG. 5 is a flowchart illustrating the touch operation control described above. The system control unit 50 starts this flowchart when a touch operation on the touch panel 70a is detected.

In step S501, the system control unit 50 determines whether the touch operation is a touch-down. In a case where the system control unit 50 determines that the touch operation is a touch-down (YES in step S501), the processing proceeds to step S502. In a case where the system control unit 50 determines that the touch operation is not a touch-down (NO in step S501), the processing proceeds to step S504.

In step S502, the system control unit 50 determines whether a touch-down timing t1 is a predetermined timing. The system control unit 50 determines whether the touch-down is performed within a predetermined time period from a timing t2 at which a specific event has occurred. The specific event is any one of the following cases where:
 (1) a shift from an eye-separation state to an eye-proximity state is performed;
 (2) a line-of-sight is detected by the line-of-sight detection block 160;
 (3) a display of an image by the EVF 29 is started when the digital camera 100 is activated or the display devices are switched from the display unit 28 to the EVF 29; and (4) an orientation (landscape or portrait) of the digital camera 100 is changed.

In step S502, if |t1−t2|<th or 0<t1−t2<th is satisfied, the system control unit 50 determines that the touch-down is performed at the predetermined timing (YES in step S502), and the processing proceeds to step S503. Otherwise (NO in step S502), the processing proceeds to step S506. The symbol "th" is a threshold representing the predetermined time period. The threshold th can be freely set by the user's operation.

In step S503, the system control unit 50 adds a touch ID to an invalid touch ID list so as to make the touch ID indicating the detected touch-down be an invalid touch point.

In step S504, the system control unit 50 determines whether the touch operation is a touch-up. In a case where the system control unit 50 determines that the touch operation is a touch-up (YES in step S504), the processing proceeds to step S505. Otherwise (NO in step S504), the processing proceeds to step S506.

In step S505, the system control unit 50 deletes the touch ID from the invalid touch ID list in a case where the touch ID corresponding to the touch operation determined to be a touch-up is included in the invalid touch ID list.

In step S506, the system control unit 50 determines whether two or more touched points (touch IDs) are registered in the invalid touch ID list. In a case where the system control unit 50 determines that two or more touched points are included in the invalid touch ID list (YES in step S506), the processing proceeds to step S507. Otherwise (NO in step S506), the processing proceeds to step S509.

In step S507, the system control unit 50 determines whether the touch operation corresponding to the detected touch ID satisfies a specific condition. The specific condition is, for example, any one of the following cases where:

(1) a touch-move with a movement distance more than a predetermined distance is performed without a touch-up performed;

(2) continuous tap operations (double tap operation) are performed; and (3) a pinch-in or a pinch-out operation between two touched points is performed.

In a case where the system control unit 50 determines that the specific condition is satisfied (YES in step S507), the processing proceeds to step S508. Otherwise (NO in step S507), the processing proceeds to step S509.

In step S508, the system control unit 50 deletes the touch ID from the invalid touch ID list.

In step S509, the system control unit 50 performs an action corresponding to the touch operation based on the touched point currently touched on except for the touch point included in the invalid touch ID list.

The touch control procedure associated with the touch operation then ends.

By executing the touch control procedure described above, the operations described in conjunction with FIGS. 3A to 3E, and FIGS. 4A to 4E are implemented.

Further, the present disclosure has been described in detail based on the exemplary embodiments. However, the present disclosure is not limited to the specific exemplary embodiments, and exemplary embodiments without departing from the gist of the present disclosure are included in the present disclosure. Further, each of the exemplary embodiments described above merely illustrates an example, and it is possible to combine the exemplary embodiments. The processing in the flowchart is described to be performed by the system control unit 50 (i.e., central processing unit (CPU)). However, it is not limited thereto, and a plurality of hardware components may share the processing.

In the exemplary embodiments described above, the case where the present disclosure is applied to a digital camera has been described as an example. However, it is not limited thereto. More specifically, the present disclosure is applicable to a display control apparatus, as long as the display control apparatus can scroll a plurality of images, such as a personal computer, a personal digital assistance (PDA), a mobile-phone terminal, a portable image viewer, a printer apparatus with a display, a digital photo frame, a gaming machine, and a music player.

Other Embodiments

The present disclosure can be implemented by performing the following processing. Specifically, the processing is performed by supplying software (program) that implements the functions according to the exemplary embodiments described above to a system or an apparatus via a network or various kinds of storage media, and a computer (central processing unit (CPU) or micro processing unit (MPU)) in the system or the apparatus reading and executing a program code. In this case, the program and the storage media that store the program constitute the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2021-0791110, filed May 7, 2021, which is hereby incorporated by reference herein in its entirety.

What is claimed is:

1. An electronic apparatus comprising:
a proximity sensor configured to detect eye proximity; and
a memory and at least one processor which function as:
a detection unit configured to detect a touch operation performed on a touch panel; and
a control unit configured to control whether to execute processing corresponding to a touch operation based on an elapsed time from when the proximity sensor detects eye proximity to when the touch operation is detected and a number of detected touch operations,
wherein, in a case where a touch operation is detected after a predetermined time period elapses from when the proximity sensor detects eye proximity, the control unit performs control to execute the processing corresponding to the touch operation regardless of the number of detected touch operations,
wherein, in a case where one touch operation is detected within the predetermined time period from when the proximity sensor detects the eye proximity, the control unit performs control not to execute the processing corresponding to the touch operation, and
wherein, in a case where a plurality of touch operations is detected within the predetermined time period from when the proximity sensor detects eye proximity, the control unit performs control to execute processing corresponding to a touch operation of a specific type among the plurality of touch operations and the control unit performs control not to execute processing corresponding to a touch operation of a type other than the specific type among the plurality of touch operations.

2. The electronic apparatus according to claim 1, further comprising:
a first display unit including the touch panel; and
a second display unit configured so that an image is visually recognizable through a finder, different from the first display unit,
wherein the proximity sensor detects eye proximity to the finder, and
wherein the first display unit and the second display unit display the image in a same direction.

3. The electronic apparatus according to claim 1, wherein the specific type of touch operation includes a touch-move operation more than a predetermined movement distance on the touch panel.

4. The electronic apparatus according to claim 1, wherein the specific type of touch operation includes a touch-move operation more than a predetermined movement distance on the touch panel, a double tap operation, and a pinch-in and pinch-out operation.

5. A control method for an electronic apparatus, the control method comprising:
detecting a touch operation performed on a touch panel;
controlling whether to execute processing corresponding to a touch operation based on an elapsed time from when a proximity sensor detects eye proximity to when the touch operation is detected and a number of detected touch operations,
wherein, in a case where a touch operation is detected after a predetermined time period elapses from when the proximity sensor detects eye proximity, the controlling performs control to execute the processing corresponding to the touch operation regardless of the number of detected touch operations,
wherein, in a case where one touch operation is detected within the predetermined time period from when the proximity sensor detects eye proximity, the controlling performs control not to execute the processing corresponding to the touch operation, and
wherein, in a case where a plurality of touch operations is detected within the predetermined time period from when the proximity sensor detects eye proximity, the controlling performs control to execute processing corresponding to a touch operation of a specific type among the plurality of touch operations, and performs control not to execute processing corresponding to a touch operation of a type other than the specific type among the plurality of touch operations.

6. The control method according to claim 5, further comprising:
performing a first display on the touch panel; and
performing a second display so that an image is visually recognizable through a finder, different from the first display,
wherein the proximity sensor detects the eye proximity to the finder, and
wherein, in the first display and the second display, the image is displayed in a same direction.

7. The control method according to claim 5, wherein, the specific type of touch operation includes a touch-move operation more than a predetermined movement distance on the touch panel.

8. The control method according to claim 5, wherein, the specific type of touch operation includes a touch-move operation more than a predetermined movement distance on the touch panel, a double tap operation, and a pinch-in and pinch-out operation.

9. A non-transitory computer-readable storage medium that stores a program for causing the electronic apparatus to perform a control method, the method comprising:
detecting a touch operation performed on a touch panel;
controlling whether to execute processing corresponding to a touch operation based on an elapsed time from when the proximity sensor detects eye proximity to when the touch operation is detected and a number of detected touch operations,
wherein, in a case where a touch operation is detected after a predetermined time period elapses from when the proximity sensor detects eye proximity, the controlling performs control to execute the processing corresponding to the touch operation regardless of the number of detected touch operations,
wherein, in a case where one touch operation is detected within the predetermined time period from when the proximity sensor detects eye proximity, the controlling performs control not to execute the processing corresponding to the touch operation, and
wherein, in a case where a plurality of touch operations is detected within the predetermined time period from when the proximity sensor detects eye proximity, the controlling performs control to execute processing corresponding to a touch operation of a specific type among the plurality of touch operations, and performs control not to execute processing corresponding to a touch operation of a type other than the specific type among the plurality of touch operations.

* * * * *